Patented Mar. 20, 1923.

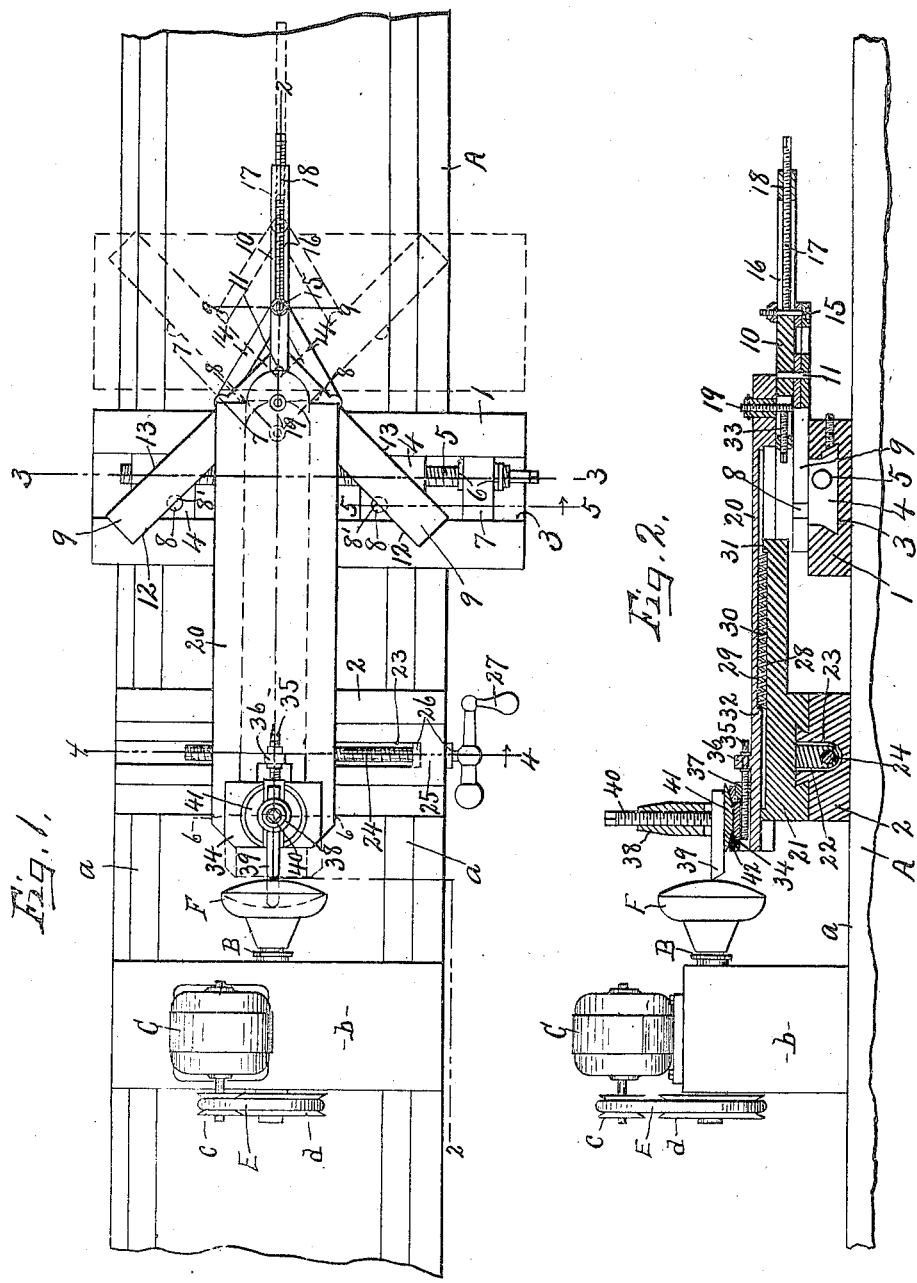

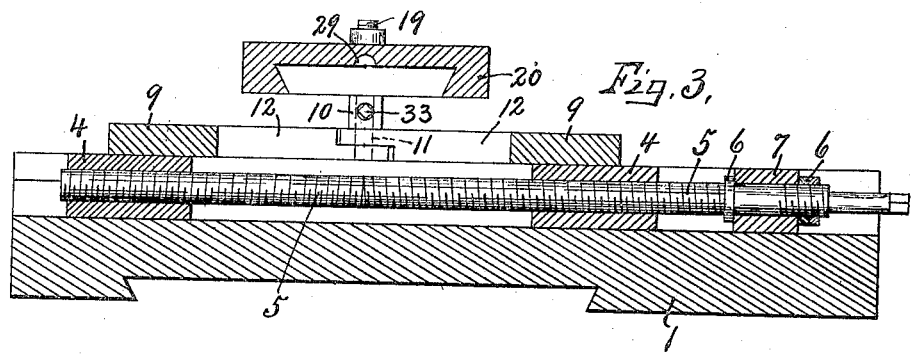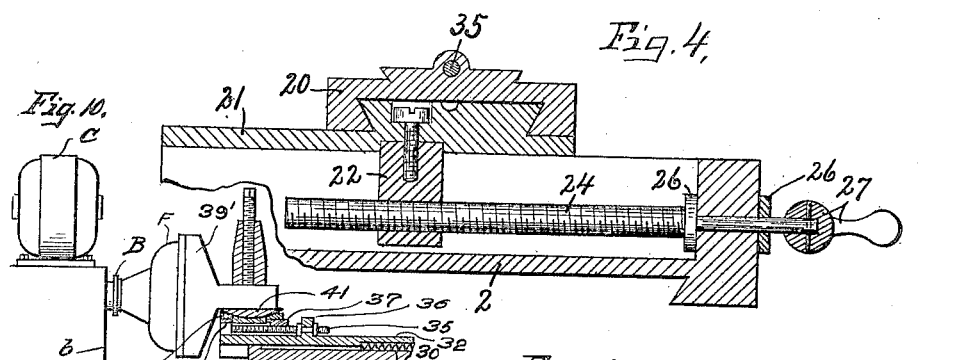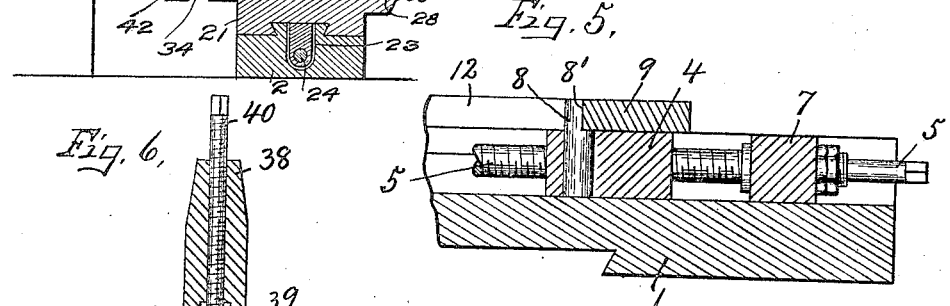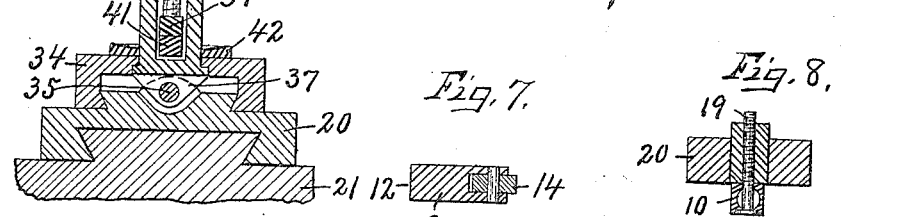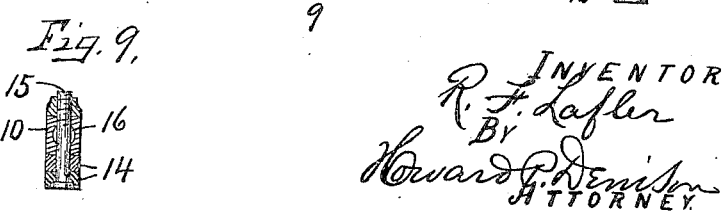

1,448,848

UNITED STATES PATENT OFFICE.

RAYMOND F. LAFLER, OF SYRACUSE, NEW YORK.

CIRCULAR ARC-FORMING DEVICE.

Application filed May 6, 1921. Serial No. 467,421.

*To all whom it may concern:*

Be it known that I, RAYMOND F. LAFLER, a citizen of the United States, and a resident of Syracuse, in the county of Onondaga, in the State of New York, have invented new and useful Improvements in Circular Arc-Forming Devices, of which the following, taken in connection with the accompanying drawings, is a full, clear, and exact description.

This invention relates to a circular arc forming device adapted to be used in connection with lathes and analogous machines for generating or producing spherical or cylindrical (either convex or concave) surfaces of widely varying radii from infinity to relatively short radii, and is particularly useful in the formation of laps commonly used in grinding of lenses, although it is evident that the same device may be used for many other purposes requiring the formation of cylindrical or spherical contours.

The invention is based upon the geometrical principle that if an angle equal to or greater than a right angle is shifted so that its straight sides ride against two points in the circumference of a circle of given radius, the vertex of that angle will describe an arc of a circle of that radius, and the main object of my invention is to attach a tool-holder to the vertex of a straight edge angle of the character mentioned in such manner that the tool will be caused to describe a true circular arc of the same radius as that described by the vertex of the angle as the latter is shifted against the circumferential points referred to.

In other words, I have sought to provide means for shifting the tool-holder radially or transversely of the axis of the work to simultaneously shift the angle in the same direction, and at the same time to utilize the straight sides of the angle and circumferential bearing points therefor for imparting the desired movement of the tool-holder axially of the work to cause the tool to produce the desired circular contour upon said work.

A further object is to provide means for simultaneously adjusting the opposite sides of the angle to vary said angle to any degree from a right angle to a straight line and 90 degrees beyond through a range of substantially 270 degrees so that the same device may be employed to produce circular convex or concave contours of any radius to infinity.

Other objects and uses relating to specific parts of the device will be brought out in the following description:

In the drawings:

Figure 1 is a top plan of a circular arc forming device embodying the various features of my invention, adjusted to produce spherical, cylindrical or convex surfaces upon the work.

Figure 2 is a longitudinal vertical sectional view of the same device taken on line 2—2, Figure 1.

Figures 3 and 4 are transverse vertical sectional views of the same machine, enlarged, taken on lines 3—3 and 4—4, Figure 1.

Figure 5 is an enlarged detail sectional view taken on line 5—5, Figure 1.

Figure 6 is a enlarged transverse vertical sectional view taken on line 6—6, Figure 1.

Figures 7, 8 and 9 are enlarged detail sectional views taken, respectively, on lines 7—7, 8—8 and 9—9, Figure 1.

Figure 10 is a detail sectional view partly in elevation, showing a modified form of tool for forming cylindrical surfaces.

The arc forming device is shown as mounted upon and movable along the bed —A— of a lathe having a work-holder —B— mounted upon the head stock —b— and driven by a motor —C— through the medium of pulleys —c— and —d— and a belt —E—, said device being set for producing convex contours upon the work as —F—.

The lathe bed —A— is provided with lengthwise dove-tailed ways —a— along and upon which are movable, the head-stock —b—, a cross-block —1— and an intermediate cross head —2— having dove-tailed grooves in their lower sides for engagement with the ways —a—, and also provided with the usual gibs and adjusting screws for taking up wear and for locking their corresponding parts in any position of adjustment if desired.

The cross-block —1— is provided with a dove-tailed guide groove —3— extending transversely of and at right angles to the axis —a— for receiving a pair of dove-tailed nuts —4—, which are located equal distances from and at opposite sides of the longitudinal center of the machine and adjustable toward and from each other by means of a screw-spindle —5— having right and left hand threads engaging corresponding apertures of their respective nuts for adjusting the latter equal distances in reverse directions at each turning movement of the screw.

One end of the screw —5— is angular for receiving a suitable wrench by which it may be rotated, and is also provided with spaced shoulders —6— for engaging opposite faces of a lug —7— on the cross-block —1— to hold the spindle against endwise movement and thereby to hold the nuts —4— in their adjusted positions, the shoulder —6— at one side of the lug —7— being adjustable axially for permitting the removal and insertion of the adjacent end of the spindle from and into the lug.

The nuts —4— are provided with upstanding bearing members —8— journaled therein to rotate about vertical axes in a plane at right angles to and equal distances from the longitudinal center of the machine passing through the axes of the work-holder —B—.

These bearing members —8— are provided with flat diametrical bearing faces —8'— adapted to be engaged by the edges of similar but opposed arms —9—, which are pivoted to each other and to a supporting member —10— by means of a pivotal pin —11— and each is provided with opposite straight and parallel edges —12— and —13—, one set of which as —12— is brought into engagement with the flat contact faces —8'— of the bearing members or pins —8— as may be necessary for producing convex or concave contours, the pivotal connection —11— between the arms —9— and their support —10— serving to permit said arms to be adjusted to different angles from a right angle to a substantially straight line and beyond to a reversely projecting right angle or through an arc of substantially 270 degrees according as may be necessary for producing convex or concave contours of different radii from one-half the distance between the centers of the pins —8— to infinity or straight lines as will be hereinafter more fully explained.

Suitable means is provided for adjusting the arms —9— to vary the angle between them, and for this purpose is provided a pair of links —14— pivotally connected at one end to the arms equal distances from and connecting the pivot —11—, and having their opposite ends pivotally connected to each other by a pivotal bolt —15— which is movable in a lengthwise slot —16— in the supporting member —10— and is held in its adjusted position against undue outward movement by an adjusting screw —17— which is engaged in a threaded aperture —18— in the outer end wall of the slot —16— as shown in figure 2 and has its inner end engaged with the pivotal bolt —15—, the inward movement of the pivotal pin —15— being prevented by the engagement of the straight edges —12— of the arms —9— with the flat faces —8'— of the bearing pins —8— through the medium of the link connection —14—.

The inner end of the support —10— is pivotally connected by a pivotal pin —19— to the outer end of a longitudinally movable plate —20— which in turn is movable along and upon a transversely movable carriage —21— and is provided in its lower side with a dove-tailed groove for receiving a dove-tailed rib on the upper side of the carriage —21— to allow the plate —20— to move rectilinearly parallel with the axis of the work-support —B—.

The carriage —21— is movable transversely of and upon the cross-head —2—, and is provided at its under side with a dove-tailed groove for receiving a dove-tailed rib on the upper side of said crosshead, whereby the carriage with the sliding plate —20— thereon may be caused to move in a plane at right angles to the axis of the work-holder —B—. The carriage —21— is provided with a central pendent lug —22— movable in a lengthwise or transverse slot —23— in the cross-head —2—, and provided with a threaded aperture for engagement by a screw spindle —24—, which is journaled at one end in a bearing —25— forming the adjacent end wall of the slot —23— and is provided with collars —26— for engaging the opposite ends of said bearing to hold the spindle against endwise movement, the outer end of said spindle being provided with a handle —27— by which the spindle may be rotated for adjusting the carriage —21— and plate —20— thereon transversely of the axis of the work-holder —B—.

The adjacent faces of the carriage —21— and superposed plate —20— are provided with central lengthwise grooves —28— and —29— for receiving a coil spring —30— having one end bearing against a shoulder —31— on the part —21— and its other end engaged with a similar shoulder —32— on the plate —20—, whereby said plate will be yieldingly urged forward toward the work, while at the same time, the pivotal pin —19— carried by said plate will be held against an adjustable stop-screw —33—, which is engaged in a threaded aperture in the inner end of the support —10—, Figure 2 so that the forward urging of the plate —20— by the spring —30— will automatically hold the arms —9— in contact with the bearing pins —8— by reason of the fact that the support —10— is connected by the pivots —11— and links —14— to both of the arms —9—.

A relatively small supplemental carriage —34— is adjustable lengthwise of and upon the inner end of the sliding plate —20— by means of an adjusting screw —35— which is journaled near one end in a lug —36— on the plate —20— and has its other end threaded and engaged with a pendent lug —37— on the under side of the supplemental carriage —34—, said screw being held against endwise movement by suitable collars engaging opposite faces of the lug —36—, as shown in Figure 2.

A tool post —38— is mounted upon the supplemental carriage —34— for receiving and supporting a cutting tool as —39—, which is held in place by a clamping screw —40— and a bar —41—, the latter having a spherical lower face seated upon the corresponding spherical face in the upper side of a bearing washer —42— Figures 2 and 6, which permits the tool to readily adjust itself to its seat and also affords a broad bearing for the under side of the tool to better resist the vibration of the tool when engaging the work.

The arms —9— are shown as adjusted to form a right angle to cause the tool —39— to cut a convex spherical contour upon the work —F— when the latter is rotated or (by the substitution of a cutting tool, as —39'—, having a straight vertical cutting edge), a convex cylindrical contour if the work is stationary of a radius equal to one-half the distance between the axes of the bearing pins —8—, under which conditions, the straight inner sides —12— of the arms —9— will be engaged with the flat bearing faces —8'—, while the axis of the pivotal pin —19— connecting the support —10— and sliding plate —20— will be at the vertex of the included angle between the inner faces of the arms a distance from a central point in a direct line between the axis of the pins —8— at right angles to said line equal to the distance between said center and axes of the pins so that the axes of said pins and pivot —19— will represent three points in the circumference of a circle having a diameter equal to the distance between the axis of the pins —8—.

Now, if the carriage —21— with the plate —20— thereon is moved transversely of the axis of the work-holder —B— and the straight sides —12— of the arms are held in contact with the flat faces of the bearing pins —8— by means of the spring —30—, it is evident that the axis of the pivot —19— at the vertex of the included angle between the straight sides —12— will describe a true arc of a circle having a radius equal to half of the distance between said pins, and that the tool —39— which takes the same movement as the plate —20— and pivot —19— will describe a circular arc of the same radius and cause the surface of the work to be machined to a circular contour of the same radius.

It is also evident from the foregoing description that if the included angle between the straight sides —12— is increased by the proper adjustment of the arms —9— through the medium of the screw —17—, and the carriage —20— is moved back and forth, it will cause the pivot —19— and cutting point of the tool —39— to move in arcs of correspondingly increased radii, and that this adjustment may be continued until the straight sides —12— of the arms —9— may be brought into the same straight line, under which conditions, the surface cut by the tool —39— would be a corresponding straight or flat surface.

This adjustment may be continued with the straight sides —12— still in engagement with the bearing pins —8— until the angle is reversed to 90 degrees, as shown by dotted lines Figure 1, to cause the tool —39— to form concave spherical or cylindrical faces upon the work —F— of any radius between infinity and half the distance between the axes of the pins —8—.

The tool-holder may be slightly adjusted toward and from the work by means of the screw —35— but the greater adjustments for cutting circular faces upon the work of widely varying radii are made by moving the cross-block —1— along its guide ways —a—, as for example when the angle between the arms —9— is increased from a right angle toward a straight line, it is necessary to move the cross-block farther away from the work to bring the bearing pins —8— into engagement with the straight edges —12— of the arms —9—, this adjustment being continued as the angle between the arms is reversed for producing concave surfaces upon the work so that if the reverse angle should be 90 degrees for cutting a concave surface having a radius equal to half the distance between the axes of the pins —8—, it would be necessary to adjust the cross-block —1— to the position shown by dotted lines in Figure 1 in order to bring the bearing pins into proper engagement with the straight edges —12— of the arms —9— providing the sliding plate —20— and work-holder remain in substantially the same relative position in which case the pivotal pin —19— would remain in the same position, as shown in Figures 1 and 2, and will then be at the vertex of the angle, it being understood that in case the axis of the pivot —19— should not be exactly in line with said vertex, it may be brought into proper alinement by means of the adjusting screw —33—, which would, of course, move the sliding plate —20— with or against the spring —30—.

In operation, assuming that the parts are adjusted to produce a convex spherical or cylindrical surface, it would be simply necessary to move the carriage —21— back and forth or transversely of the axis of the work by means of a hand-screw —24— during which operation, the sliding plate —20— with the tool-holder thereon would be urged toward the work by the spring —30—, and will thereby cause the tool to cut the surface of the work to the desired contour.

The angle between the arms —9— may be increased at will to any desired extent by simply loosening the adjusting-screw —17— which would allow the spring —30— to urge the plate —20— forwardly or toward the work to keep the straight edges —12— in contact with the bearing pins —8—, it being understood that the cross-block —1— may be adjusted to compensate for the changed positions of the arms —9— to keep the pins —8— in contact with the straight edges —12— if desired, the adjustment of the cross-block being effected by hand or by any other suitable means.

What I claim is:

1. In a circular arc forming device, two members having spaced bearing points in one and the same circular arc, a pair of arms having straight-edges disposed at an angle to each other and engaging said bearing-points, the vertex of the angle formed by said straight-edges being disposed in the same arc and in a line bisecting said angle, and means for holding the arms in fixed relation, said arms being movable across and against the bearing points to cause the vertex of the angle to travel around the circular arc.

2. In a circular arc forming device, two members having spaced bearing points in one and the same circular arc, a pair of arms having straight-edges disposed at an angle to each other and engaging said bearing-points, the vertex of the angle formed by said straight-edges being disposed in the same arc and in a line bisecting said angle, means for holding the arms in fixed relation, said arms being movable across and against the bearing points to cause the vertex of the angle to travel around the circular arc, and yielding means for holding the arms in contact with the bearing points.

3. In a circular arc forming device, two members having spaced bearing points in one and the same circular arc, a pair of arms having straight-edges disposed at an angle to each other and engaging said bearing-points, the vertex of the angle formed by said straight-edges being disposed in the same arc and in a line bisecting said angle, means for holding the arms in fixed relation, said arms being movable across and against the bearing points to cause the vertex of the angle to travel around the circular arc, a tool-holder, and means for transmitting parallel motion from the vertex of the angle of said arms to the tool-holder to cause the tool to move in an arc of the same radius as that of the first named arc.

4. In combination with a rotary work-holder, a carriage movable transversely of the axis of the work-holder, a member mounted upon the carriage to move therewith and having an independent movement lengthwise thereof, a tool-holder mounted on said member to move therewith, yielding means for urging said member in one direction to cause the tool to engage the work, bearing-members arranged in spaced relation equal distances from and at opposite sides of the produced axis of the work-holder, members having straight-edges disposed at an angle to each other and engaging said bearing-members, a pivot turning in the first named member about an axis coincident with the vertex of the angle between said straight-edges and movable with said first named member, and connections between said pivot and straight-edge-members to cause the latter to move with the first named member.

5. In combination with a work-holder, bearing-members located equal distances from and at opposite sides of the produced axis of the work-holder, straight-edge-members having their straight edges disposed at an angle to each other and engaging said bearing-members, means for adjusting the straight-edge-members to different angles, means for moving said straight-edge-members across their respective bearing-members without changing the angle to which they are adjusted, whereby the vertex of the angle between the straight-edges is caused to move in a circular arc, a tool-holder, and means actuated by the last named means for causing the tool-holder to travel in a circular arc of the same radius as that through which the vertex of the angle between the straight-edges is moved.

6. In a circular arc forming device, bearing-members in spaced relation in the arc of the circle, straight-edge-members having their straight edges disposed at an angle to each other and engaging said bearing-members, means for moving said straight-edge-members across and against said bearing-members to cause the vertex of the angle between the straight-edges to move in a circular arc, and means for adjusting said straight-edge-members to different angles to vary the radius of the arc through which the vertex travels.

7. In combination with a rotary work-holder, a carriage movable transversely of and in a plane at right angles to the produced axis of the work-holder, a plate mounted upon and movable with the carriage and having an independent movement lengthwise thereof, a tool-holder mounted upon said plate, a spring for urging the plate in one direction to cause the tool to engage the work, and means for causing the plate to move longitudinally while being moved transversely by the carriage.

8. In combination with a rotary work-holder, a carriage movable transversely of the axis of the work-holder, a plate mounted upon and movable with the carriage and having an independent movement parallel with said axis, a tool-holder mounted on said plate, means for urging the plate in one direction to cause the tool to engage the work, a member pivoted to said plate to move therewith and having an independent movement about the axis of the pivot, bearing-members supported equal distances from and at opposite sides of the produced axis of the work-holder, straight-edge-members having their straight edges disposed at an angle to each other and engaging said bearing-members, the vertex of said angle being coincident with the axis of said pivot, and connections between the straight-edge-members and said pivoted member to cause said straight-edge-members to move with the plate and to have an independent movement about the axis of the pivot.

9. In combination with a rotary-work-holder, a carriage movable transversely of the axis of the work-holder, a plate mounted upon and movable with the carriage and having an independent movement parallel with said axis, a tool-holder mounted on said plate, means for urging the plate in one direction to cause the tool to engage the work, a member pivoted to said plate to move therewith and having an independent movement about the axis of the pivot, bearing-members supported equal distances from and at opposite sides of the produced axis of the work-holder, straight-edge-members having their straight edges disposed at an angle to each other and engaging said bearing-members, the vertex of said angle being coincident with the axis of said pivot, connections between the straight-edge-members and said pivoted member to cause the said straight-edge-members to move with the plate and to have an independent movement about the axis of the pivot, and means for adjusting the straight-edge-members to different angles.

10. In a circular arc forming device, turnable bearing-members supported in spaced relation with their axes in a circular arc and provided with diametrical bearing-faces, straight-edge-members having their straight edges disposed at an angle to each other and engaged with said bearing-faces, said straight-edge-members being movable across said bearing-faces without changing the angle between their straight edges to cause the vertex of the angle to travel along said circular arc.

11. In a circular arc forming device, turnable bearing-members supported in spaced relation with their axes in a circular arc and provided with diametrical bearing-faces, straight-edge-members having their straight edges disposed at an angle to each other and engaged with said bearing-faces, said straight-edge-members being movable across said bearing-faces without changing the angle between the straight-edges to cause the vertex of the angle to travel along said circular arc, and means for adjusting said straight-edge-members to different angles to vary the radius of the arc through which the vertex of the angle between said straight-edges may travel.

12. In combination with a rotary work-holder, bearing-pins spaced equal distances from and at opposite sides of the produced axis of the work-holder, straight-edge-members having their straight edges engaging said bearing-members, a plate movable transversely of said axis and having an independent movement lengthwise thereof, a pivot turnable on said plate about an axis coincident with the vertex of the angle between said straight-edges, connections between said pivot and straight-edge-members for moving the latter across the bearing-members, and a tool-holder mounted upon said plate.

In witness whereof I have hereunto set my hand this 18th day of March, 1921.

RAYMOND F. LAFLER.

Witnesses:
H. E. CHASE,
M. R. COOKE.